US008806572B2

(12) United States Patent
McGrew et al.

(10) Patent No.: US 8,806,572 B2
(45) Date of Patent: Aug. 12, 2014

(54) AUTHENTICATION VIA MONITORING

(75) Inventors: David A. McGrew, Poolesville, MD (US); Sandeep Rao, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 939 days.

(21) Appl. No.: 12/475,486

(22) Filed: May 30, 2009

(65) Prior Publication Data

US 2010/0306816 A1 Dec. 2, 2010

(51) Int. Cl.
*H04L 29/06* (2006.01)

(52) U.S. Cl.
CPC ............ *H04L 63/1408* (2013.01); *H04L 63/08* (2013.01)
USPC ............... 726/3; 713/150; 713/153; 713/154; 713/161

(58) Field of Classification Search
CPC .............................. H04L 63/1408; H04L 63/08
USPC ............................................................. 726/3
See application file for complete search history.

(56) References Cited

U.S. PATENT DOCUMENTS

| | | | | |
|---|---|---|---|---|
| 6,980,660 | B1 * | 12/2005 | Hind et al. | 380/282 |
| 7,350,227 | B2 | 3/2008 | McGrew et al. | |
| 7,509,491 | B1 | 3/2009 | Wainner et al. | |
| 2001/0016877 | A1 * | 8/2001 | Dancs et al. | 709/227 |
| 2002/0093915 | A1 * | 7/2002 | Larson | 370/235 |
| 2003/0028773 | A1 * | 2/2003 | McGarvey et al. | 713/176 |
| 2003/0074555 | A1 * | 4/2003 | Fahn et al. | 713/156 |
| 2003/0182431 | A1 * | 9/2003 | Sturniolo et al. | 709/227 |
| 2004/0049714 | A1 * | 3/2004 | Marples et al. | 714/43 |
| 2005/0063352 | A1 * | 3/2005 | Amara et al. | 370/338 |
| 2005/0076198 | A1 * | 4/2005 | Skomra et al. | 713/156 |
| 2005/0086197 | A1 * | 4/2005 | Boubez et al. | 707/1 |
| 2005/0102522 | A1 * | 5/2005 | Kanda | 713/176 |
| 2005/0272405 | A1 * | 12/2005 | Tomlinson et al. | 455/404.2 |
| 2006/0048210 | A1 * | 3/2006 | Hildre et al. | 726/1 |
| 2006/0168213 | A1 * | 7/2006 | Richardson et al. | 709/225 |
| 2006/0285493 | A1 * | 12/2006 | Manuja et al. | 370/235 |
| 2007/0206617 | A1 * | 9/2007 | Andreasen et al. | 370/401 |
| 2008/0060055 | A1 * | 3/2008 | Lau | 726/3 |
| 2008/0077791 | A1 * | 3/2008 | Lund et al. | 713/156 |
| 2008/0077796 | A1 * | 3/2008 | Lund et al. | 713/173 |
| 2010/0217975 | A1 * | 8/2010 | Grajek et al. | 713/157 |

OTHER PUBLICATIONS

Zhao et al., Certificates Verification Based on Trust Matrix in PKI, Aug. 2006, First International Conference on Innovative Computing, Information and Control, vol. 1, pp. 52-55.*

* cited by examiner

*Primary Examiner* — Mohammad L Rahman
*Assistant Examiner* — Kenneth Chang
(74) *Attorney, Agent, or Firm* — Hickman Palermo Truong Becker Bingham Wong LLP

(57) ABSTRACT

Systems, methods, and other embodiments associated with authentication via monitoring are described. One example method includes detecting a data flow in which indicia of identity (DFWIOI) travel between a first endpoint and a second endpoint. The DFWIOI may be partially encrypted. The example method may also include collecting an identity data associated with the DFWIOI from the DFWIOI, the first endpoint, the second endpoint, and so on. The example method may also include making an authentication policy decision regarding the DFWIOI based, at least in part, on the identity data. The example method may also include controlling a networking device associated with the DFWIOI based, at least in part, on the authentication policy decision.

23 Claims, 6 Drawing Sheets

AUTHENTICATION VIA MONITORING

COPYRIGHT NOTICE

A portion of the disclosure of this patent document contains material that is subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

Enforcing security in a network may include preventing data from leaking out of the network and preventing viruses and bots that hijack servers from coming into the network. Data leakage has become one of the top concerns for corporate clients who install networks, ranking just below concerns regarding viruses. Network security devices (e.g., firewalls) have attempted to prevent unauthorized access to networks and data leakage from networks since the inception of network security.

Deep packet inspection (DPI) is a conventional security approach used by network security devices to examine a data and a header of a data packet in a data flow that passes through a network security device. The DPI approach may search for viruses, non-compliance with protocol, spam, intrusions, pre-defined criteria, and so on, within the data of the data packet. The DPI approach may use several criteria to decide if the packet is to be allowed or dropped. In contrast, shallow packet inspection may only check the header of the data packet. Shallow packet inspection is considered to be insufficient to enforce network security in many network environments and may be insufficient to enforce fine-grained access control.

There has been an increase in the use of encrypted data throughout networks. This may be due, in part, to the increased use of virtual private networks (VPNs) that encrypt network traffic between different private network locations that form a single network. These private networks may be connected by an unsecure public network (e.g., the Internet). Another reason for the increase is the use of encryption at the transport layer. Network applications like web traffic (HTTP) use encryption provided by the Secure Sockets Layer (SSL) or Transport Layer Security (TLS) protocols, which encrypt the application traffic between a client and server. Although encryption may appear to increase security for VPNs or for applications using SSL or TLS, encryption decreases and/or eliminates the effectiveness of DPI. This is because encryption masks harmful data from the scanning associated with DPI that examines the data of the data packet. SSL is becoming a nearly ubiquitous choice for securing a number of applications including, for example, web-based transactions, emails, Web VPNs, and so on. Due to simplicity and cost-effectiveness, SSL is also used to identify and validate endpoints and to encrypt communications. SSL may be used within an intranet (e.g., LAN) to secure communications between departments, between groups, and so on.

Another conventional approach associated with network security devices is session level verification. Session level verification may keep track of whether a data packet of a data flow is at the start of a new connection (e.g., new data flow), a part of an existing connection, or is an unauthorized packet. This approach may scrutinize the first packet of a data flow, however, subsequent packets in the data flow may be assumed to be secure due to the authentication of the first packet in the data flow. This approach may verify the identity of the source of a data flow only at initiation (e.g., login). However, botnet controllers that have infiltrated the network may spoof the address of an endpoint of an already authenticated connection. This spoofing allows the botnet to send messages that traverse the network security device. By using the already authenticated connection (e.g., pin hole through the network security device) the data may exit the "secure" network and be monitored by another bot that uses promiscuous mode monitoring. This may facilitate data leakage. Another risk involves spoofing or masquerading the identity of legitimate entities, as may occur during phishing attacks.

Other conventional approaches of network security devices analyze protocols of the data flow and determine if the data flow is being routed through the appropriate port based on the protocol. This approach may determine if an unwanted protocol is attempting to sneak through a non-standard port that does not match the protocol. However, this approach does not catch sophisticated network intrusion software that can match ports with their associated protocols.

An additional issue unrelated to security may also arise. Encrypted data traffic may be difficult to classify. Examination of the type of data carried by a data packet may allow a network security device the ability to determine an appropriate level of service (e.g., quality of service (QoS)) to provide for the data flow. For example, streaming video may require high bandwidth allocation to prevent interrupted (e.g., choppy) video display. However, a streaming encrypted video may not be identified as a video stream by a network security device. This may prevent the encrypted video stream from receiving the high bandwidth allocation that it requires.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

BRIEF OVERVIEW

Figure 1:
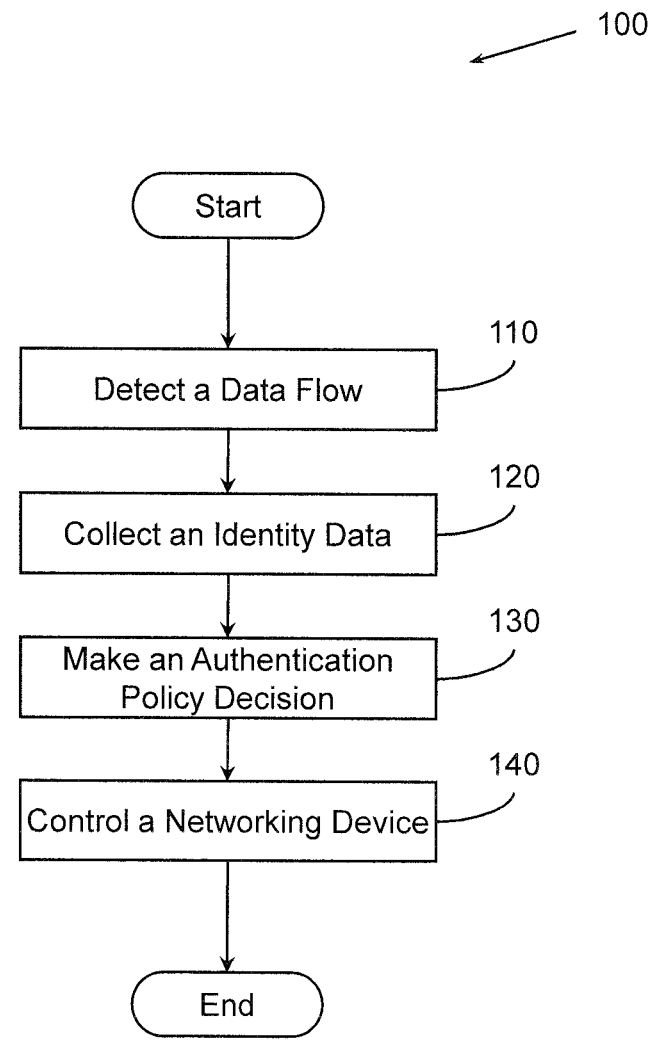
FIG. 1 illustrates an example method associated with authentication via monitoring.

The increased use of encrypted data flows to facilitate security in networks that include unsecure public networks (e.g., VPNs) has created new security issues. Network security devices using deep packet inspection (DPI) and/or other inspection techniques may not be able to detect threats contained in the encrypted data of a data flow. Authentication of a source and/or a receiver associated with the data flow may facilitate enforcing security in an environment where data inspection is unfeasible. Even in cases where data inspection (e.g., DPI) is possible, it may be desired to complement existing inspection to enforce fine grained control access by assertively validating the identity contained in a flow. Authentication of sources and/or receivers by a network device may be known as authentication via monitoring (AvM). AvM may also be associated with identity networking that identifies sources and receivers of information. Identity networking may be considered to be using the identity of the sender and/or receiver of a packet when processing the packet. AvM facilitates a network device learning that identity information. AvM may increase security because trusted sources and receivers are less of a threat than unknown sources and receivers of data. Identity networking is increasing in importance for enforcing access control and services on networks. This increase is relevant to wireless networks where IP addresses and connection points are dynamic. Since IP addresses and connection points are dynamic, while identity is a more static parameter, identity may be more suitable for enforcing policies. Without this type of reliable identification, anonymous clients, un-trusted clients, and so on, may be able to connect to a server, establish an encrypted session, then use the secure channel to attack the server. AvM facilitates preventing this type of activity.

AvM and identity networking may also decrease and/or eliminate data leakage of non-encrypted data flows because trusted sources and trusted receivers of data are less likely to allow malicious behavior. DPI approaches may only look for malicious code like viruses and only flag text fitting certain criteria. However, DPI may miss plain text that appears to be non-malicious and does not meet the criteria for flagging. For example, the customer list of a bank including social security numbers may not be flagged by DPI that searches for malicious virus code. However, AvM approaches may flag the suspicious receiver of messages because AvM does not depend on scanning the data. Instead, AvM authenticates the source and/or the receiver of the data flow. AvM approaches may prevent an authorization for the transfer of the data to the suspicious receiver. Thus, leaks of data from a secure network may be prevented. In addition to authenticating the endpoints of a flow, AvM facilitates providing additional information including, for example, a crypto-algorithm, and parameters that are negotiated for the flow and that may be used by a device (e.g., firewall, proxy) to enforce access control policies.

The network security device may decide whether to allow, block or limit access to a network based on the results of AvM associated with receivers, sources, (e.g., identity networking) and/or the messages associated with those receivers and sources. Different identity authentication or verification approaches may be used with AvM to give network security devices an ability to identify and/or verify sources and receivers of data flows to prevent attacks. In addition to authenticating end-user identity, AvM may also facilitate identifying and validating end-point devices (e.g., anti-counterfeiting certificate) that facilitate enforcing device or location authorizations.

In some AvM embodiments, verification of digital signatures associated with data flows and their sources and/or receivers may be performed. Verification may include communicating with a digital exchange that verifies the digital signature. AvM authentication may attempt to verify the digital signature with a third party digital exchange. The verification provides the network security device with a cryptographic guarantee that an endpoint that generated the signature is the holder of the private key associated with the public key. Additionally, the AvM modification may prevent botnets from leaking information from a network. While a third party exchange may be consulted, one skilled in the art will appreciate that a network security device may validate a signature on its own so long as it has the public key used to sign the message or has the public key of the certificate authority.

In cases where a session is hijacked on both sides of a firewall by bots that transfer data through encryption, verification using digitally signed data packets may be necessary. Digital signatures (e.g., digitally signed data packets) are an approach to prevent the leaking of data and/or insertion of malicious data. Digital signatures (e.g., digital certificates) may only be controlled and given out by the legitimate applications, not the hijackers. Therefore, the use of digital signatures (e.g., digital certificates) on each packet may prevent data leakage even when both sides of the network are corrupted. Additionally, nonces may be utilized with a packet flow to ensure that authentication is valid. Nonces may also prevent replay attacks. A nonce is a number that is used once within a particular cryptographic session. Since colluding devices may defeat a firewall either by using existing pinholes or by masquerading services on known and trusted ports, inspection devices may be configured to have AvM complemented with out of band validation methods including, for example, port-scan, system audit, NAC, and so on.

AvM packet level authentication and/or verification is stronger than session-level verification because it prevents bogus packets from spoofing the firewall. In one approach, bogus packets may be defeated by implementing conformance checking of the encrypted protocol. In one embodiment this may include lightweight SSL inspection. The approach may also include enforcing policy constraints to limit flows. Bogus packets may spoof the source address of an endpoint of a valid session-level connection. For example, a botnet controller may attempt to send instructions to another bot that is on the other side of the firewall. One approach is for the botnet to send a message through a pre-existing pinhole (e.g., verified session-level connection) in the firewall and rely on "promiscuous" monitoring by the bot on the other side of the network connection.

AvM may facilitate increasing the level of security of the network over conventional approaches without making changes to the software or configurations of an end host (e.g., endpoints). AvM may improve reliability of network traffic policing with un-cooperating end hosts that attempt communication through a firewall utilizing authentication via monitoring. Un-cooperating hosts may not share digital signatures (e.g., digital certificates) with each other. An "un-cooperating host" may be considered to be a host that is unaware of the presence and/or operation of firewall. In other AvM embodiments, digital certificates may be utilized on a per flow basis to prevent replay attacks. AvM may be followed by an access control decision (e.g., authorization) based on the policy decision made during the AvM approach. AvM does not need to propagate private keys, nor does AvM require the generation of public keys on the fly, as might be needed if the network security device were proxying a cryptographic connection. AvM need not overload a single public key in multiple certificates. Additionally, AvM may complement proxy-based security approaches. Additionally, AvM does not require access to private keys but instead may optionally validate the possession of the private key of the certificate holder through an out of band method, by monitoring specific events in a flow, and so on.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

FIG. 1 illustrates a method 100 associated with authentication via monitoring. Method 100 may include, at 110, detecting a data flow. The data flow detected at 110 may be a data flow in which indicia of identity (DFWIOI) travel between a first endpoint and a second endpoint. The DFWIOI may be partially encrypted. While an encrypted DFWIOI is identified, in one embodiment the DFWIOI may not be encrypted but may still include information that can be used to authenticate one or both endpoints. One skilled in the art will appreciate that typically a cryptographic protocol starts out with some exchange of information. For example, public keys and digital signatures may be exchanged, a message authentication code (MAC) may be computed using a shared secret key, and so on. This allows participants to authenticate each other.

Method 100 may also include, at 120, collecting an identity data. The identity data collected at 120 may be associated with the DFWIOI, the first endpoint, the second endpoint, and so on. The identity data associated with the DFWIOI may be data associated with the identities of the first endpoint and/or the second endpoint. While identity data is described, one skilled in the art will appreciate that the data may also include attributes, assertions, link layer addresses, TCP ports, UDP ports, and other parameters.

Method 100 may also include, at 130, making an authorization policy decision. The authorization policy decision made at 130 may concern the DFWIOI based, at least in part, on the identity data.

In one embodiment, the authentication policy decision determination made at 130 may be based, at least in part, on the identity data. The identity data may include a digital certificate, a message authentication code (MAC), an internet protocol (IP) destination address of the DFWIOI, an IP source address of the DFWIOI, a nonce generated by the first endpoint, a nonce generated by the second endpoint, a validation information for the digital certificate from a digital certificate exchange, and so on. A nonce may be one of, a random number, or a pseudo random number that is used once to verify identity. Because it may only be used once, the nonce may not be copied and replayed. Thus, the nonce may be useful in preventing replay attacks. In one example, a nonce may be a deterministic non-repeating value. For example, a nonce may be a 32-bit counter field that starts at a pre-determined value (e.g., zero) and that is manipulated (e.g., incremented) once for each packet that is sent. In another example, a nonce may be a timestamp.

In one embodiment, the authentication policy decision may control a quality of service (QoS) for the DFWIOI, may control whether to establish a connection for the DFWIOI, and so on. The authentication policy decision may first determine whether to allow the connection and then it may determine the type of connection (e.g., QoS) to be made if the connection was allowed. The connection used by the DFWIOI may travel through the networking device that is associated with the DFWIOI. This networking device may be a firewall that polices data traveling through the network.

In one embodiment, the QoS controls a data transfer rate, a memory allocation associated with the DFWIOI, a security monitoring feature associated with the networking device, a packet delay, a packet jitter target rate, and so on.

In one embodiment, the data transfer rate may be based, at least in part, on a type of data traffic. The type of data traffic may be determined by viewing a handshake associated with the DFWIOI. Additionally, the type of traffic may be associated with the sender or the receiver of the DFWIOI. This may be an example of identity networking. One skilled in the art will realize that the type of data being sent may be based on the sender, the receiver, and/or both the sender and the receiver.

Method 100 may also include, at 140, controlling a networking device. The networking device may be associated with the DFWIOI. Control of the networking device at 140 may be based, at least in part, on the authentication policy decision made at 130. The network device may be a firewall that the data flow traverses when traveling between the first endpoint and the second endpoint. The firewall may act as a security agent that allows or denies the data flow the ability to traverse the firewall. One skilled in the art will realize that a data flow may or may not actually travel between the first endpoint and the second endpoint. In cases where the data flow is denied the right to traverse the firewall, the data flow is still a data flow except it does not actually flow to its intended destination. For example, the first endpoint may request to send the data flow to the second endpoint, however, the networking device may not allow the connection based on the authentication policy decision made at 130.

While FIG. 1 illustrates various actions occurring in serial, it is to be appreciated that various actions illustrated in FIG. 1 could occur substantially in parallel. By way of illustration, a first process could detect a data flow at 110, a second process could collect an identity data at 120, a third process could make and authentication policy decision at 130, and a fourth process could control a networking device at 140. While four processes are described, it is to be appreciated that a greater and/or lesser number of processes could be employed and that lightweight processes, regular processes, threads, and other approaches could be employed. As described above, the identity data may be associated with user identity, device identity, location identity, and so on.

In one example, executable instructions associated with performing a method may embodied as a logic encoded in a tangible media for execution. When executed, the instructions may perform a method. Thus, in one example, a logic encoded in one or more tangible media may store computer executable instructions that if executed by a machine (e.g., processor) cause the machine to perform method 100. While executable instructions associated with the above method are described as being embodied as a logic encoded in one or more tangible media, it is to be appreciated that executable instructions associated with other example methods described herein may also be stored on a tangible media.

A "tangible media", as used herein, refers to a medium that stores signals, instructions and/or data. A tangible media may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a tangible media may include, but are not limited to, a floppy disk, a flexible disk, a hard disk, a magnetic tape, other magnetic medium, an application specific integrated circuit (ASIC), a compact disk CD, other optical medium, a random access memory (RAM), a read only memory (ROM), a memory chip or card, a memory stick, and other media from which a computer, a processor or other electronic device can read.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

Figure 2:
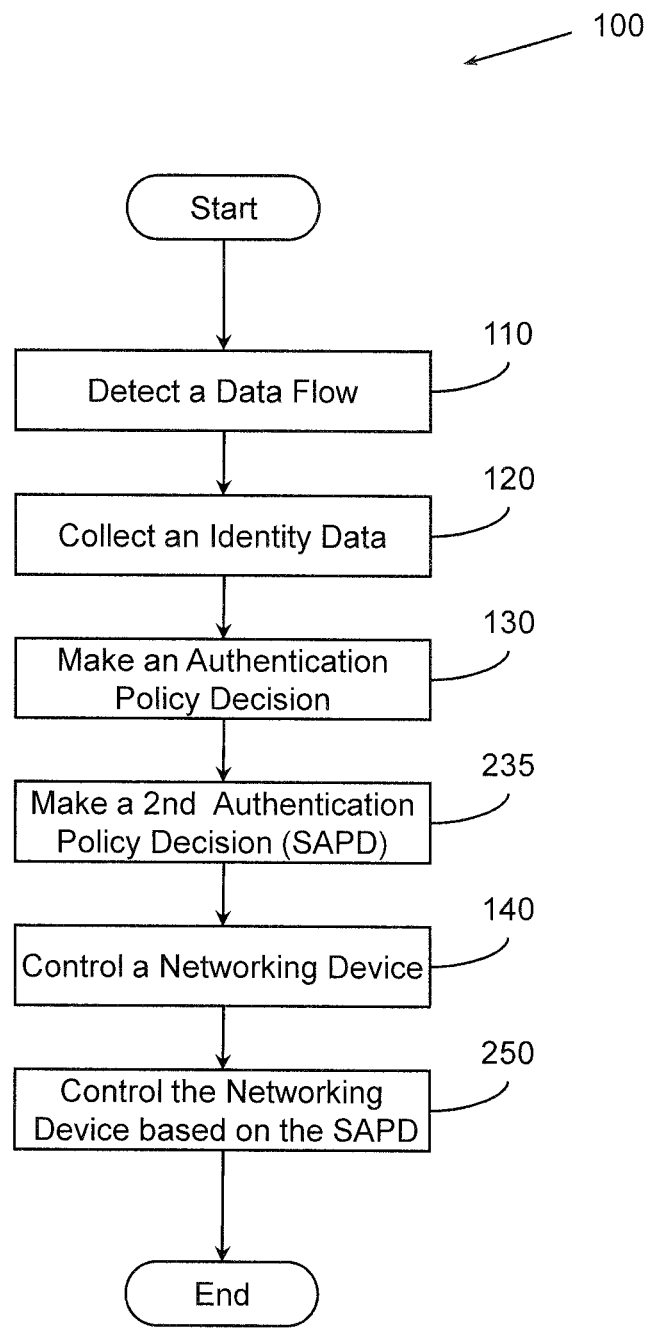
FIG. 2 illustrates another example method associated with authentication via monitoring.

FIG. 2 illustrates another embodiment of method 100 associated with authentication via monitoring. This embodiment of method 100 has two authorization decisions, one at 130 and one at 235. The trigger for making decision 1 may occur when data from one data flow in one direction (e.g., server to client) is learned. Method 100 may also include, at 235, making a second authentication policy decision (SAPD). The SAPD made at 235 may be associated with a DFWIOI that originates at the second endpoint and attempts to travel to the first endpoint. The trigger for the second decision at 235 may occur when data from the data flow in the other direction (e.g., client to server) or in both directions, is learned. The second authentication policy decision may be based, at least in part, on a trust that the first endpoint assigns to the second endpoint. The trust assigned by the first endpoint to the second endpoint may be based, at least in part, on the first endpoint accepting the DFWIOI from the second endpoint and establishing the connection, the QoS given to the DFWIOI received from the second endpoint to the first endpoint, and so on.

Method 100 may also include, at 250, controlling the network device. The networking device may be controlled at 250 based, at least in part, on the second authentication policy decision. In one embodiment, the networking device may control a second connection between a second DFWIOI that travels from the second endpoint to a third endpoint. The networking device may control the QoS for the second connection between the second DFWIOI. The networking device may control the second connection, and the QoS for the second connection, based, at least in part, on the second authentication policy decision.

Figure 3:
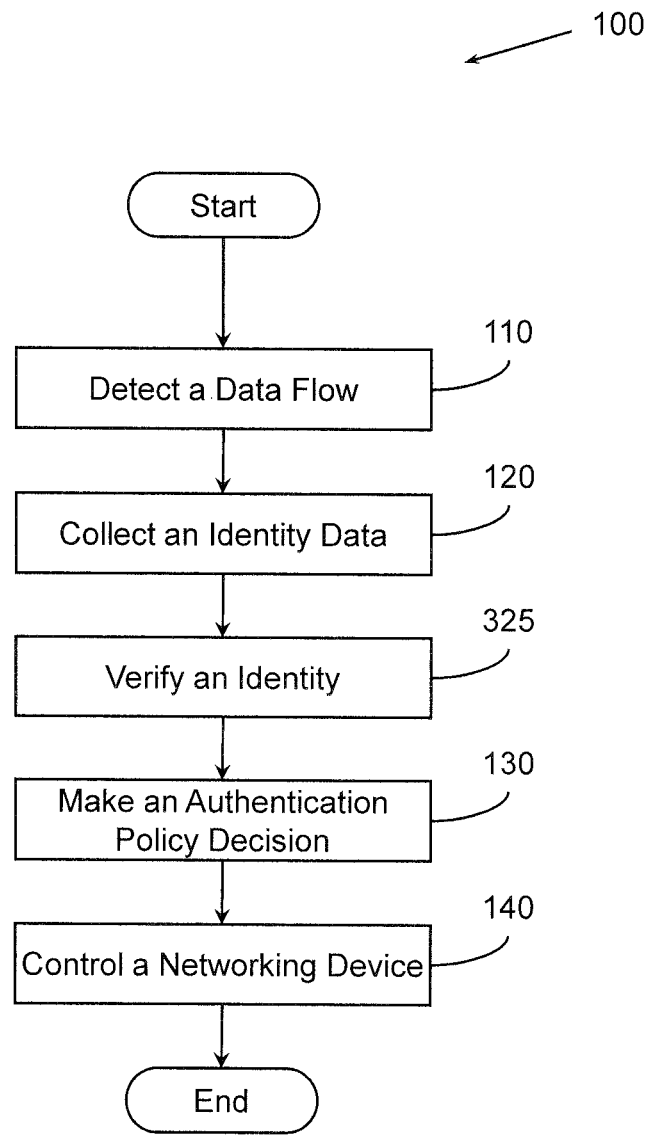
FIG. 3 illustrates another example method associated with authentication via monitoring.

FIG. 3 illustrates another embodiment of method 100 associated with authentication via monitoring. Method 100 may include, at 325, verifying an identity. The identity that is verified at 325 may be the identity of the first endpoint, the identity of the second endpoint, and so on. The identity may be verified at 325 by acquiring a collected information from the digital certificate exchange. The collected information may include, for example, the identity of the first endpoint and/or the identity of the second endpoint. The collected information may facilitate validation of the digital certificate retrieved from the DFWIOI. The digital certificate may also be known as a digital signature.

Validating a digital signature may add protection when both endpoints in the data flow are not fully trusted. For example, consider the possibility that a host behind a firewall has been subverted by a worm, virus, or Trojan horse, and is now a "bot" that will attempt to contact an external host (e.g. external botnet) that is acting as a controller for the bot behind the firewall. In this situation, neither endpoint may be trusted. In this example, if signatures are not checked by the firewall, then the server could pass itself off as a trusted server by inserting a digital signature (e.g., digital certificate) from a trusted server and a random signature value. Thus signature checking facilitates protecting against botnets and their associated data leakage. However, when one of the endpoints is trusted, digital signature checks are not necessary.

Figure 4:
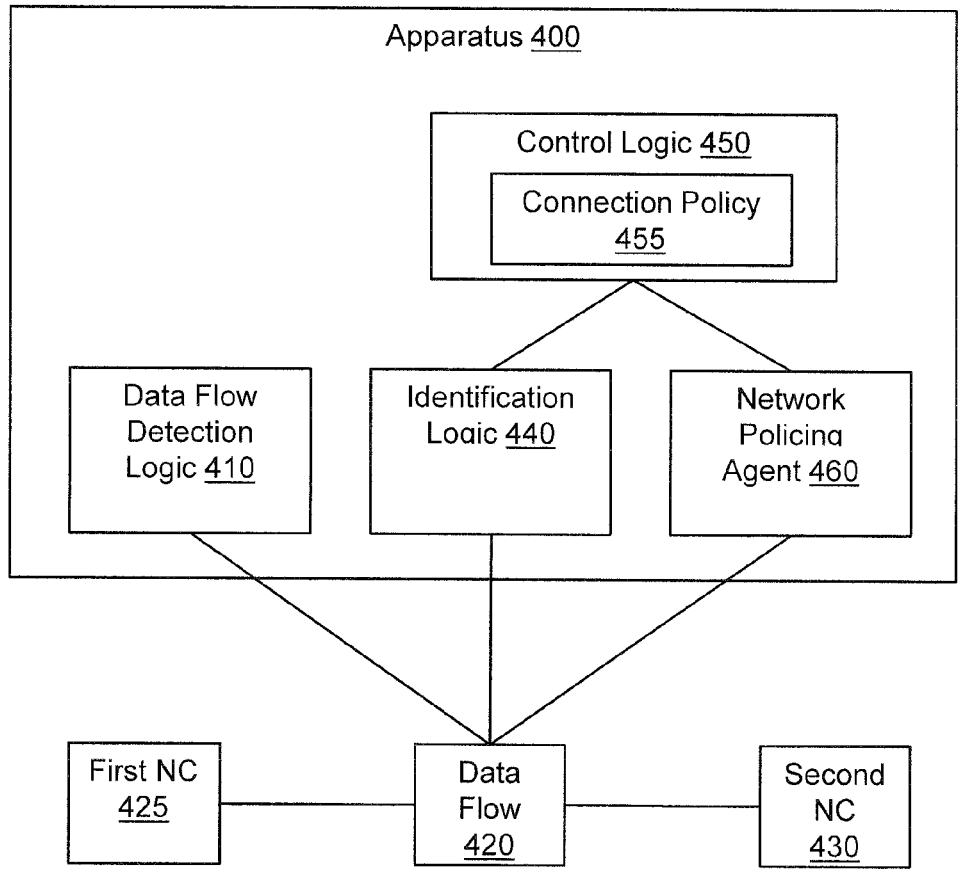
FIG. 4 illustrates an example apparatus associated with authentication via monitoring.

FIG. 4 illustrates an apparatus 400 associated with authentication via monitoring. Apparatus 400 includes a data flow detection logic 410 to detect a data flow 420 having indicators of identity. The data flow 420 may be between a first network communicator (NC) 425 and a second NC 430. In one embodiment, where AvM is employed by a host-based inspection engine to passively monitor flows in to and out of the host, the data flow monitoring may occur on a single NC.

"Logic", as used herein with respect to apparatus 400 and other apparatus, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

Apparatus 400 may also include an identification logic 440 to collect an identification information from the data flow 420, the first NC 425, the second NC 430, and so on. In one embodiment, the identification information may include a digital certificate, a message authentication code (MAC), an internet protocol (IP) destination address of the data flow, an IP source address of the data flow, a nonce generated by the first endpoint, a nonce generated by the second endpoint, and so on.

In one embodiment, the identification information includes a validation information for the digital certificate from a digital certificate exchange. When a flow carries multiple certificates, the identification information may include multiple certificates. The validation information is to verify the identity of the first NC 425, the second NC 430, and so on. One skilled in the art will realize that the digital certificate may be carried in the data flow 420 and may be used to validate that the data flow comes from and/or is received by a particular NC (e.g., first NC 425, second NC 430), an endpoint, a supplicant, a client, and so on. The validation information may facilitate validation of the digital certificate retrieved from the data flow 420, the first NC 425, the second NC 430, and so on. In one embodiment, the validation may happen in real time, may occur out of band with short latency, and so on. In one embodiment, if a digital signature is created using the public key in the certificate, then that signature may be validated.

In one embodiment, the nonce may be a random number, or a pseudo random number. The nonce may be used once to verify the identity of the first NC 425, the second NC 430, the data flow 420, and so on. The nonce may prevent a replayed message from passing a message (e.g., information) between the first NC 425 and the second NC 430. This may prevent data leaks and/or network intrusion via a replay attacks and/or other surreptitious data transfer method.

Apparatus 400 may also include a control logic 450 to determine a connection policy 455 for the data flow 420. The connection policy 455 may be based, at least in part, on the identification information. The connection policy 455 may control whether to allow a connection for the data flow 420, a quality of service (QoS) for the data flow 420, and so on. In one embodiment, the QoS may include parameters to facilitate control of a data transfer rate, a memory allocation associated with the data flow, a security monitoring feature, a packet delay, a packet jitter target rate, and so on.

Apparatus 400 may also include a network policing agent 460 to control the data flow 420 based, at least in part, on the connection policy 455. In one embodiment, the connection policy 455 for the data flow 420 may be based on a trust between NCs. The trust between NCs may be based, at least in part, on the trust that the first NC assigns to the second NC. The trust assigned by the first NC to the second NC may be based, at least in part, on the first NC accepting the data flow from the second NC and allowing the connection, on the QoS assigned by the first NC to the data flow received from the second NC, and so on.

In one embodiment, the connection policy 455 for a second data flow between the second NC 430 and a third NC may be based, at least in part, on the trust assigned by the first NC 425 to the second NC 430. The connection policy 455 for the second data flow may facilitate a connection for the second data flow that travels from the second NC 430 to the third NC, the QoS for the second data flow that travels from the second NC 430 to the third NC, and so on. For example, if the first NC 425 trusted the second NC 430 to make a connection, the connection policy 455 may infer that the second NC 430 may be trusted. The level of trust may depend on the associations (e.g., network affiliations) between the first NC 425 and the second NC 430. However, if the third NC has similar associations, the connection policy 455 may infer that since the first NC 425 trusted the second NC 430, then the third NC may also trust the second NC 430. Restated, if the first NC 425 allows the second NC 430 to connect when the second NC 430 initiates the connection, the connection policy may allow the second NC 430 to connect to a third NC when the second NC initiates the connection with the third NC.

In one embodiment, the network policing agent 460 may passively monitor the data flow 420. In one embodiment, the networking policing agent 460 is a firewall. One skilled in the art will realize that the networking policing agent 460 may appear to be independent of the data flow 420 between the first NC 425 and the second NC 430. However, one skilled in the art will realize that the network policing agent 460 may also reside in between the first NC 425 and the second NC 430. For example, network policing agent 460 may be a firewall through which the data flow 420 must pass. See FIG. 5 where the first endpoint 510 traverses to the third endpoint 530 through the network security device 540. The network security device 540 may be a firewall and may be similar to network policing agent 460.

In one embodiment, data in the data flow 420 includes data associated with a handshake between the first NC 425 and the second NC 430. The network policing agent 460 resides between the first NC 425 and the second NC 430. In one embodiment, the data flow detection logic 410 may detect the handshake. The identification logic 440 collects the identification information from the handshake. The handshake may be a process of negotiation that sets parameters of a communications channel (e.g., data flow) between the first NC 425 and the second NC 430 before normal communication begins. The network policing agent 460 may extract information (e.g., identity information) from the handshake. This information may be used by the network policing agent 460.

Figure 5:
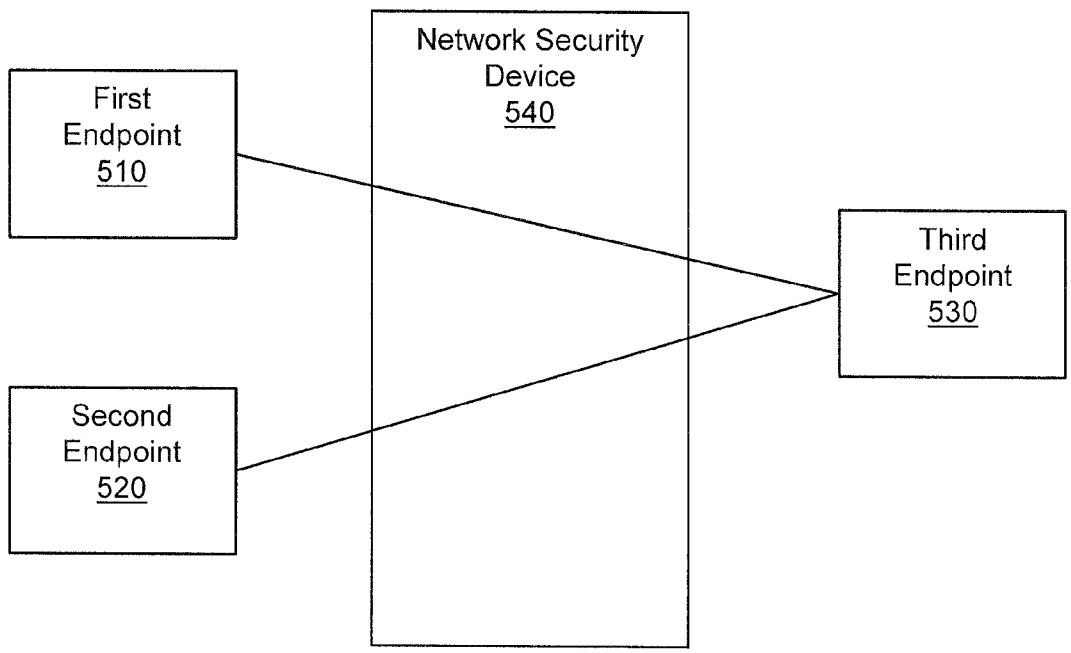
FIG. 5 illustrates an example environment associated with authentication via monitoring.

FIG. 5 illustrates an example environment 500 that is associated with authentication via monitoring. Environment 500 includes a first endpoint 510, a second endpoint 520, and a third endpoint 530. Environment 500 may also include a network security device 540 (e.g., firewall). In one example, first endpoint 510 and third endpoint 530 may attempt to establish a connection. It may be determined that the endpoints 510 and 530 are part of the same organization so the connection should be trusted. The determination that the first endpoint 510 and the third endpoint 530 are in the same organization may be made by the network security device 540

Network security device 540 may use authentication via monitoring (AvM) to monitor the handshake (e.g., SSL, TLS, and so on) between the endpoints. Identities of the endpoints may be acquired. Digital signatures of the endpoints 510 and 530 may be gathered from the endpoints 510 and 530 and/or from a data flow that is attempting to establish the connection. Nonces associated with the endpoints 510 and 530 may also be checked and/or verified. This may allow the network security device 540 to unambiguously associate the data flow attempting to establish the connection with the first endpoint 510 and/or the third endpoint 530. Based on the verified identities of one or more of the endpoints 510 and 530, an authorization may occur for the connection. If the connection is allowed, the data flow may pass through the network security device 540.

In another embodiment, a second endpoint 520 may be contacted by the third endpoint 530 to establish a connection for a second data flow. The network security device 540 may use a previous determination that the third endpoint 530 was trustworthy enough to communicate with the first endpoint 510 to control access. This determination may be used to decide if the third endpoint 530 should communicate with the second endpoint 520. For example, if the first endpoint 510 trusted the third endpoint 530, then the second endpoint 520 may also trust the third endpoint 530. Thus, while in AvM it is preferred to validate both end point identities, in some embodiments it may not be required to identify both end points.

Figure 6:
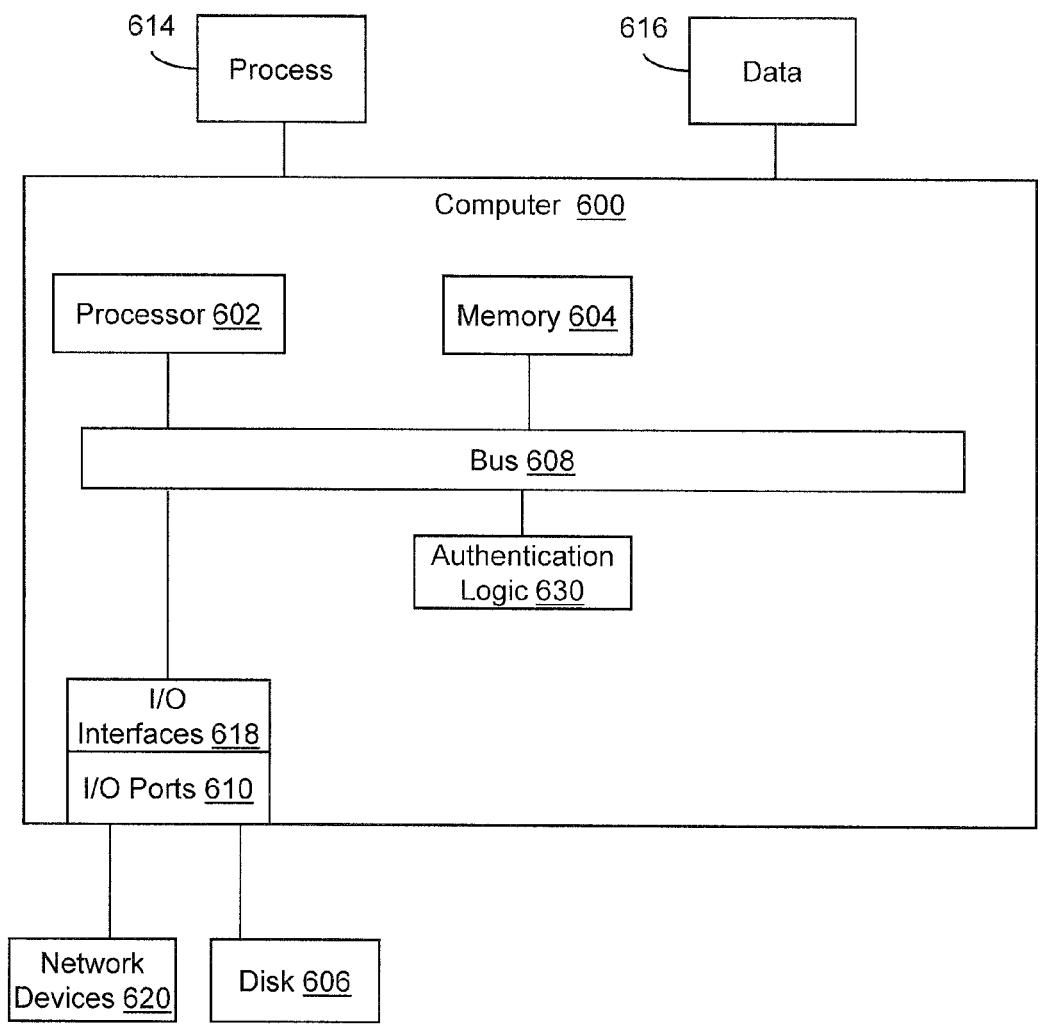
FIG. 6 illustrates an example computing environment in which example systems and methods, and equivalents, may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. In one example, the computer 600 may include an authentication logic 630 configured to facilitate authentication via monitoring. In different examples, the logic 630 may be implemented in hardware, software, firmware, and/or combinations thereof. While the logic 630 is illustrated as a hardware component attached to the bus 608, it is to be appreciated that in one example, the logic 630 could be implemented in the processor 602.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Hardware component", as used herein, refers to a computer-related entity. Hardware components may include, for example, a process running on a processor, a processor, an object, an executable, and a thread of execution. A hardware component(s) may include a process and/or thread. A hardware component may be localized on one computer and/or may be distributed between multiple computers.

Logic 630 may provide means (e.g., hardware, software, firmware) for detecting a data flow having indicators of identity. The data flow may be between a first network communicator (NC) and a second NC. The means may be implemented, for example, as an ASIC programmed to facilitate authentication via monitoring. The means may also be implemented as computer executable instructions that are presented to computer 600 as data 616 that are temporarily stored in memory 604 and then executed by processor 602.

Logic 630 may also provide means (e.g., hardware, software, firmware) for collecting an identity data associated with the data flow from the data flow, the first NC, and the second NC, and so on. Logic 630 may also provide means (e.g., hardware, software, firmware) for determining a connection policy for the data flow. The connection policy controls whether to allow an exchange of information for the data flow, a quality of service (QoS) for the data flow, and so on. Logic 630 may also provide means (e.g., hardware, software, firmware) for controlling a networking device through which the data flow passes based, at least in part, on the connection policy.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM, programmable ROM (PROM), and so on. Volatile memory may include, for example, RAM, static RAM (SRAM), dynamic RAM (DRAM), and so on.

A disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD recordable (CD-R) drive, a CD rewriteable (CD-RW) drive, a digital versatile disk and/or digital video disk read only memory (DVD ROM), and so on. The memory 604 can store a process 614 and/or a data 616, for example. The disk 606 and/or the memory 604 can store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., peripheral component interconnect express (PCIE), 1394, universal serial bus (USB), Ethernet). The bus 608 can be types including, for example, a memory bus, a memory controller, a peripheral bus, an external bus, a crossbar switch, and/or a local bus.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624, (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

In some examples, "database" is used to refer to a table. In other examples, "database" may be used to refer to a set of tables. In still other examples, "database" may refer to a set of data stores and methods for accessing and/or manipulating those data stores.

What is claimed is:

1. A non-transitory tangible media encoded with executable instructions which when executed are operable to perform a method, the method comprising:
  in a firewall:
  detecting a packet data flow of a cryptographic protocol between a first endpoint and a second endpoint;
  collecting an identity data of the first endpoint and the second endpoint;
  where the identity data is included in the packet data flow and comprises a digital certificate of the first endpoint and at least one attribute value of the second endpoint;
  making a decision, based, at least in part, on the identity data, whether to admit or deny the packet data flow through the firewall and on a trust that the first endpoint assigns to the second endpoint while establishing a connection with the second endpoint;
  verifying an identity of one or more of, the first endpoint, and the second endpoint, based on the identity data from the digital certificate and the at least one attribute value, where the collected identity data facilitates validation of the digital certificate;
  based, at least in part, on validating endpoint identity data included in the packet data flow of the cryptographic protocol that is observed at the firewall, admitting or denying the packet data flow through the firewall.

2. The media of claim 1, where the identity data is partially encrypted.

3. The media of claim 1, where the identity data further comprises one or more of, authorization attributes, policy assertions, link layer addresses, TCP port identifiers, and UDP port identifiers.

4. The media of claim 1, where the identity data further comprises one or more of, a message authentication code (MAC), an internet protocol (IP) destination address, an IP source address, a nonce generated by the first endpoint, a nonce generated by the second endpoint, and a validation information for the digital certificate from the digital certificate.

5. The media of claim 4, where the decision depends on one or more of, cryptographic information, a digital signature, and a message authentication code.

6. The media of claim 1, where the collected identity data facilitates verification of certificates associated with one or more of an authentication, authorization, and accounting server, and a certificate authority.

7. The media of claim 1, where the decision controls one or more of, a quality of service (QoS), and whether to establish the connection for the first endpoint.

8. The media of claim 1, where the decision controls one or more of, whether the connection is to be allowed based on an identity, whether an out of band audit on a particular endpoint is to be triggered, a privacy constraint for the particular endpoint, identifying a particular flow to be proxied, identifying the particular flow to be unproxied, identifying the particular flow to be forwarded without inspection, generating a record of an identity of an encrypted session created by the particular endpoint, providing a specialized service based on an endpoint identity, performing a URL redirection, customizing a consent page based on a server identity, performing device authorization based on a machine certificate, performing flow classification based on an identity, enforcing a traffic mirroring option, enforcing a traffic by-pass option, customizing a consent page, provisioning services based on the server identity, authorizations based on the server identity, generating an alarm based on a certificate property, generating an event based on the certificate property, generating a log entry based on the certificate property, validating whether a server is white-listed, validating whether the server is black-listed, and triggering a complementary passive decryption and inspection method.

9. The media of claim 7, where the QoS controls one or more of, a data transfer rate, a memory allocation, a security monitoring feature associated with the networking device, a packet delay, and a packet jitter target rate.

10. The media of claim 9, where the data transfer rate is based, at least in part, on a type of data traffic, and where the type of data traffic is determined by viewing a handshake.

11. The media of claim 7, the method comprising:
  making a second authentication policy decision based, at least in part, on the trust that the first endpoint assigns to the second endpoint, and where the trust assigned by the first endpoint to the second endpoint is based, at least in part, on one or more of, the first endpoint a establishing the connection, and the QoS received from the second endpoint to the first endpoint; and
  controlling the firewall based, at least in part, on the second authentication policy decision.

12. The media of claim 11, where the firewall controls one or more of, a second connection from the second endpoint to a third endpoint, and the QoS for the second connection, and where the firewall controls one or more of, the second connection, and the QoS for the second connection, based, at least in part, on the second authentication policy decision.

13. An apparatus, comprising:
  a firewall;
  a micro-processor;
  a data flow detection logic to detect a packet data flow of a cryptographic protocol between a first network communicator (NC) and a second NC;
  an identification logic to collect an identification information from the first NC and the second NC, the identification information being associated with indicators of identity;
  where the identification information is included in the packet data flow and comprises a digital certificate of the first NC and at least one attribute value of the second NC;
  a control logic to make a decision for the packet data flow, based, at least in part on the identification information, whether to allow or deny the packet data flow through the firewall and on a trust that the first NC assigns to the second NC while establishing a connection with the second NC;

verify an identity of one or more of, the first NC, and the second NC, based on the identification information from the digital certificate and the at least one attribute value, where the collected identification information facilitates validation of the digital certificate;

a network policing agent to admit or deny the packet data flow through the firewall based, at least in part, on validating endpoint identity data included in the packet data flow of the cryptographic protocol that is observed at the firewall.

14. The apparatus of claim 13, where the network policing agent is to passively monitor the packet data flow without adding latency to an endpoint data flow and without modifying the packet data flow between endpoints.

15. The apparatus of claim 13, wherein the firewall is implemented in any one of, a switch, a wireless access point, or a network interface card.

16. The apparatus of claim 14, where the packet data flow comprises a handshake between the first NC and the second NC, and where the network policing agent resides between the first NC and the second NC.

17. The apparatus of claim 16, where the data flow detection logic is to detect the handshake, and where the identification logic collects the identification information from the handshake.

18. The apparatus of claim 13, where the identification information further comprises one or more of, a message authentication code (MAC), an internet protocol (IP) destination address of the packet data flow, an IP source address of the packet data flow, a nonce generated by the first NC, an identifier associated with a secret key, an identifier associated with a public key, the public key, and a nonce generated by the second NC.

19. The apparatus of claim 18, where the identification information comprises a validation information for the digital certificate, where the validation information is to verify an identity of one or more of, the first NC, and the second NC, and where the validation information facilitates validation of the digital certificate retrieved from one or more of, the packet data flow, the first NC, and the second NC.

20. The apparatus of claim 18, where the nonce is one of, a random number, a timestamp, and a pseudo random number, where the nonce is used once to verify an identity of one or more of, the first NC, the second NC, the packet data flow, and where the nonce prevents a replayed message from passing a message between the first NC and the second NC.

21. The apparatus of claim 13, where the identify information comprises quality of service (QoS) data that includes parameters to facilitate control of one or more of, a data transfer rate, a memory allocation associated with the packet data flow, a security monitoring feature, a packet delay, and a packet jitter target rate.

22. The apparatus of claim 13, where the trust assigned by the first NC to the second NC is based, at least in part, on one or more of, the first NC accepting the packet data flow from the second NC and allowing the connection, and the QoS assigned by the first NC to the packet data flow received from the second NC.

23. The apparatus of claim 22, where the decision for a second data flow between the second NC and a third NC is based, at least in part, on the trust assigned by the first NC to the second NC, and where the connection policy for the second data flow facilitates one or more of, the connection for the second data flow that travels from the second NC to the third NC, and the QoS for the second data flow that travels from the second NC to the third NC.

* * * * *